G. Lautenschlager,
Hobby Horse.

No. 96,708. Patented Nov. 9, 1869.

Witnesses:
Gustave Dieterich
Kinchman

Inventor:
G. Lautenschlager
per Mmm H
Att'ys.

United States Patent Office.

GUSTAV LAUTENSCHLAGER, OF CINCINNATI, OHIO, ASSIGNOR TO HIMSELF AND ALEXANDER S. PATERSON, OF SAME PLACE.

Letters Patent No. 96,708, dated November 9, 1869; antedated October 29, 1869.

IMPROVEMENT IN ROCKING-HORSES.

The Schedule referred to in these Letters Patent and making part of the same.

*To all whom it may concern:*

Be it known that I, GUSTAV LAUTENSCHLAGER, of Cincinnati, in the county of Hamilton, and State of Ohio, have invented a new and improved Advancing Rocking-Horse; and I do hereby declare that the following is a full, clear, and exact description of the same, which will enable others skilled in the art to make and use the same, reference being had to the accompanying drawings, in which—

Similar letters of reference indicate corresponding parts.

Figure 1:
Figure 1 represents a side elevation, partly in section, of my invention.
Figure 2:
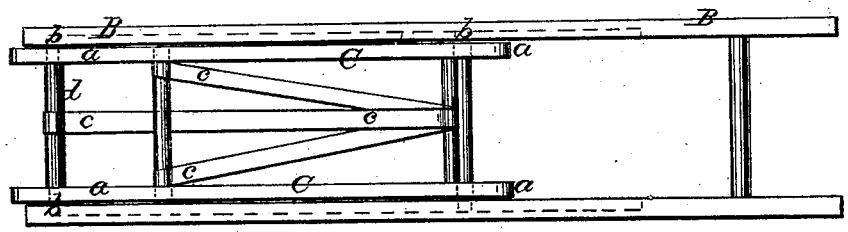
Figure 2 is an inverted plan view of the same.

The object of this invention is to construct a rocking-horse for children, which will, during the rocking-motion, advance on the floor, thus, not only imitating the natural horse in appearance and form, but also in the motion produced.

The invention consists in arranging a sliding frame between the rockers of the apparatus, said frame being so arranged that it will, in certain positions, sustain the weight of the whole device, allowing the upper part to slide forward, when thus supported, and when in the act of rocking.

A, in the drawing, represents a rocking-horse, of suitable size and form.

B B are its rockers.

Between them is arranged a frame, C, which has its side-bars *a a* fitted against the rockers B, the lower edge of said bars being parallel with but projecting somewhat below that of the rockers.

Pins, *b b*, projecting from the bars *a* into grooves of the rockers, or an equivalent guidance, will allow the frame C to move backward and forward between the rockers.

The frame C is, by means of springs *c c*, connected with a front cross-bar, *d*, or other front part of the rocking-horse. These springs have the tendency to draw or move the frame C forward.

When the horse is rocked forward, its weight will be supported on the lower edge of the frame C, while the momentum of the motion will cause the upper part, that is to say, the horse and the rockers, to slide forward on the frame C, while the latter retains its hold upon the ground.

During the next backward swing of the horse, the weight will be taken from the frame C, and the springs *c* will draw it forward in the rockers, so that it will be in position for the next forward motion. Thus, as the horse is moving back and forward, it will, at the same time, progress on the ground, and I therefore term it "The Progressive Rocking-Horse."

Having thus described my invention,

What I claim as new, and desire to secure by Letters Patent, is—

The progressive rocking-horse, made and operating substantially as herein set forth and described.

The above specification of my invention signed by me, this 30th day of March, 1869.

GUSTAV LAUTENSCHLAGER.

Witnesses:
L. HOMANN,
LEWIS SCHNEIDER.